United States Patent [19]
Kuizenga et al.

[11] Patent Number: 6,007,664
[45] Date of Patent: Dec. 28, 1999

[54] METHOD AND APPARATUS FOR RAPID CURING OF EPOXY ADHESIVE IN SECURING TOGETHER SLIDER/GIMBAL ASSEMBLIES EMPLOYED IN DISK DRIVE SYSTEMS

[75] Inventors: Dirk J. Kuizenga, Sunnyvale; Richard H. Johnson, Cupertino, both of Calif.

[73] Assignee: SDL, Inc., San Jose, Calif.

[21] Appl. No.: 09/118,568

[22] Filed: Jul. 17, 1998

Related U.S. Application Data

[60] Provisional application No. 60/053,047, Jul. 21, 1997.

[51] Int. Cl.[6] .............................. B32B 31/28; G11B 5/48
[52] U.S. Cl. .................................. 156/272.8; 156/275.5; 156/275.7; 156/379.8; 156/380.9; 360/104
[58] Field of Search ........................... 156/272.8, 273.9, 156/275.5, 275.7, 379.8, 380.9; 360/104, 107, 108; 219/121.63, 121.64, 121.6, 121.85

[56] References Cited

U.S. PATENT DOCUMENTS

| | | | |
|---|---|---|---|
| 5,491,597 | 2/1996 | Bennin et al. | 360/104 |
| 5,504,640 | 4/1996 | Hagen | 360/104 |
| 5,537,269 | 7/1996 | Zarouri | 360/97.01 |
| 5,638,234 | 6/1997 | Hagen | 360/104 |

*Primary Examiner*—Michael W. Ball
*Assistant Examiner*—Michael A Tolin
*Attorney, Agent, or Firm*—W. Douglas Carothers, Jr.

[57] ABSTRACT

A method is disclosed for curing epoxy adhesive between the slider head and load/gimbal suspension assemblies of a disk drive access actuator employing a concentrated pulsed heat source rather than conventional, broadly applied heat source as employed in the past, such as oven heating or UV exposure. The laser source power is delivered via an optical fiber to the slider air-bearing surface (ABS) of the slider head assembly so that with this approach, the time for curing can be minimized and accurately controlled without causing damage to the assembly, and the overall curing step in the manufacturing process is reduced in time of application. Apparatus in the form of a fixture, such as an anvil element, provides a convenient gauge and support for alignment of the laser output beam with the slider ABS to which the heat for curing is to be applied as well as provide for its heat sinking.

4 Claims, 4 Drawing Sheets

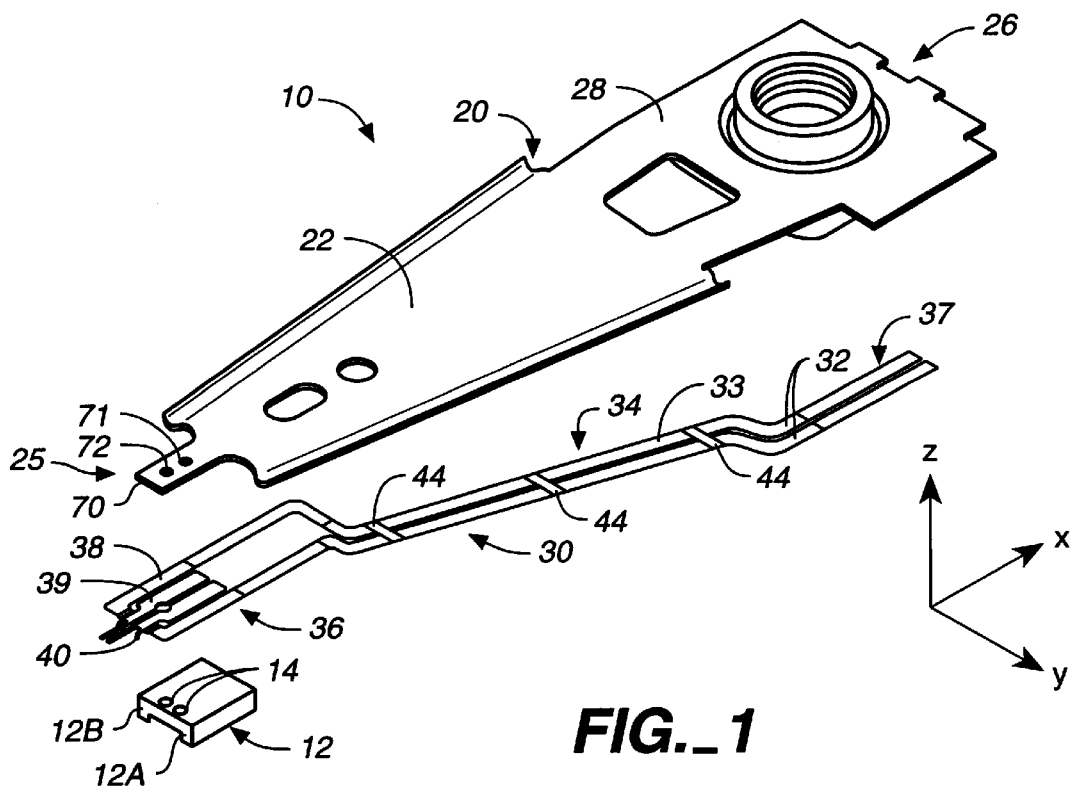
FIG._1
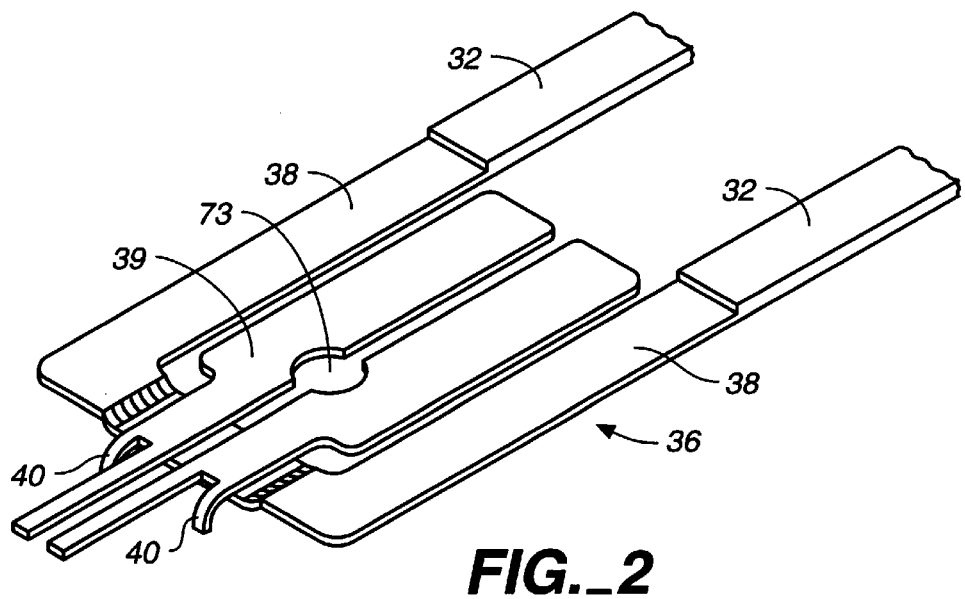
FIG._2

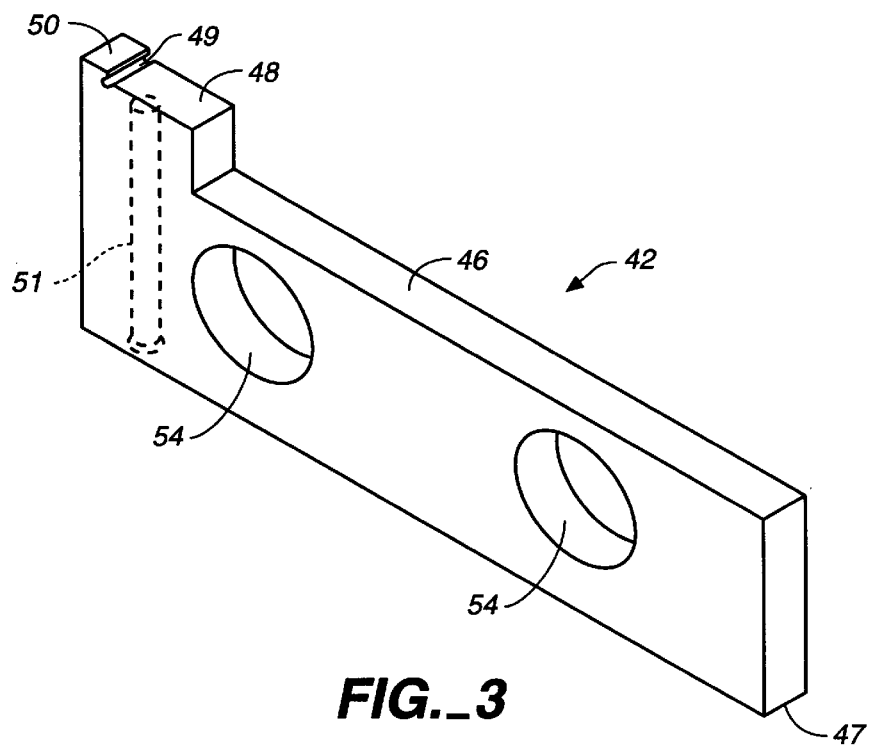
FIG._3
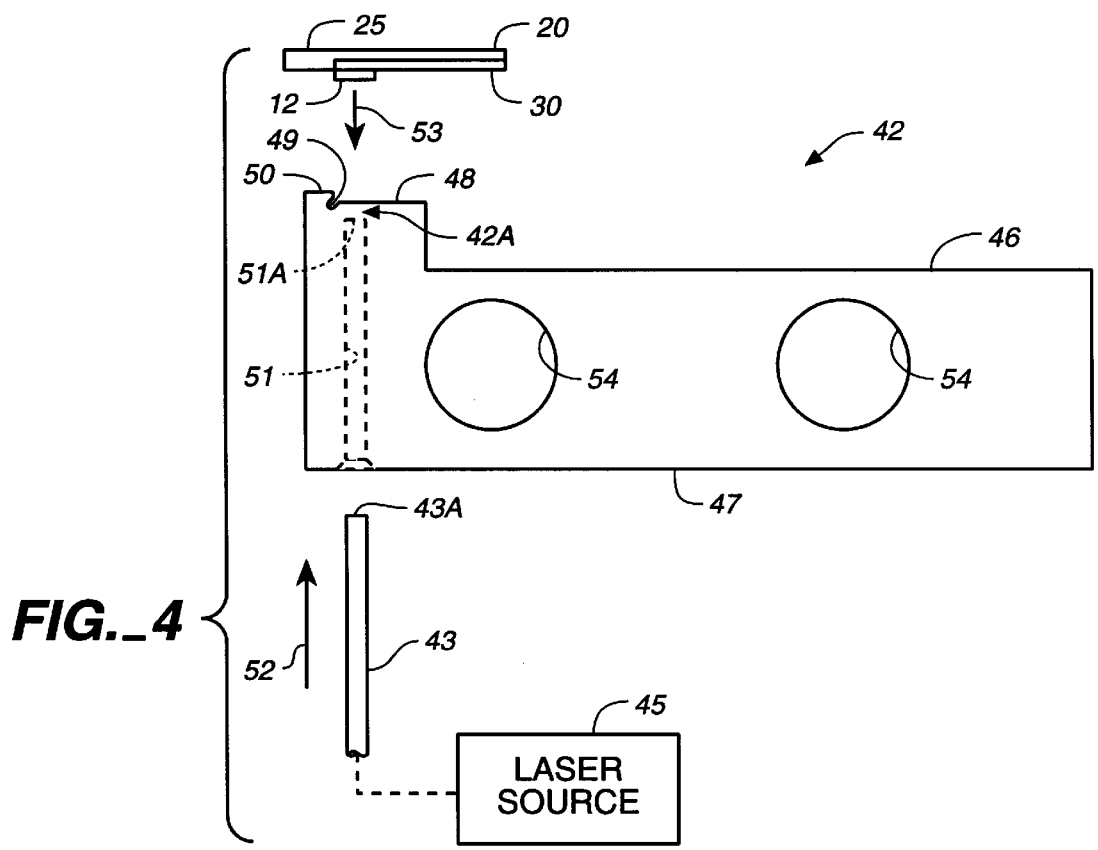
FIG._4

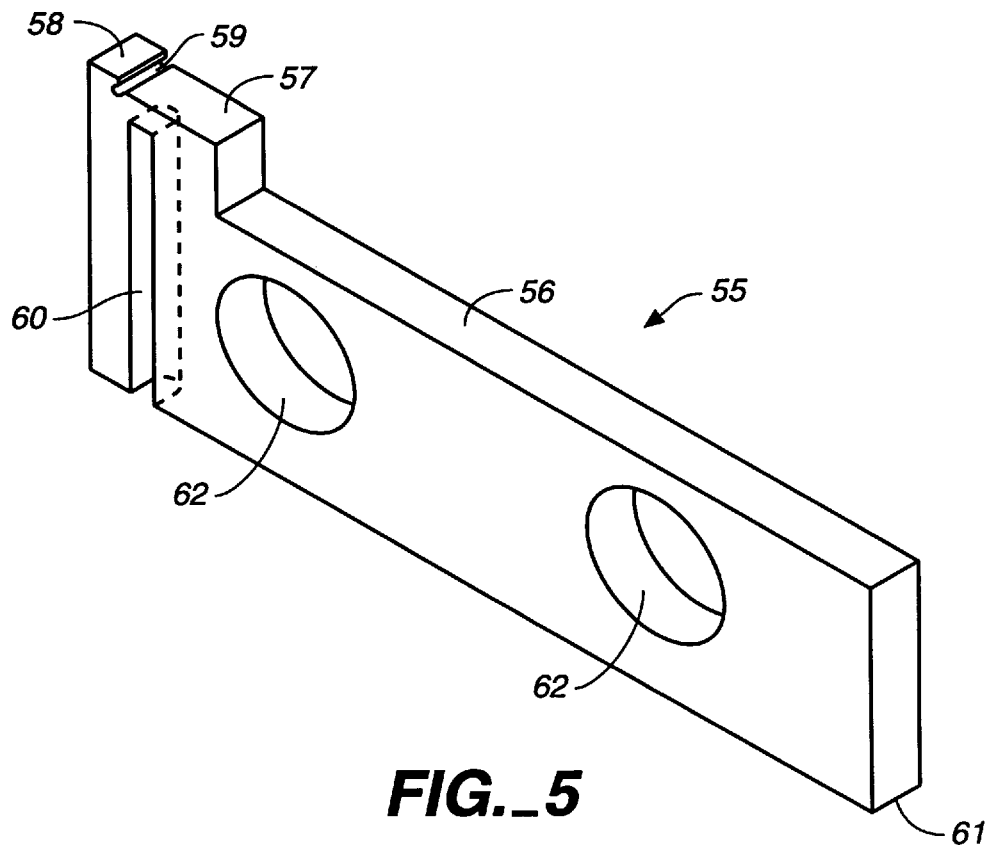
FIG._5
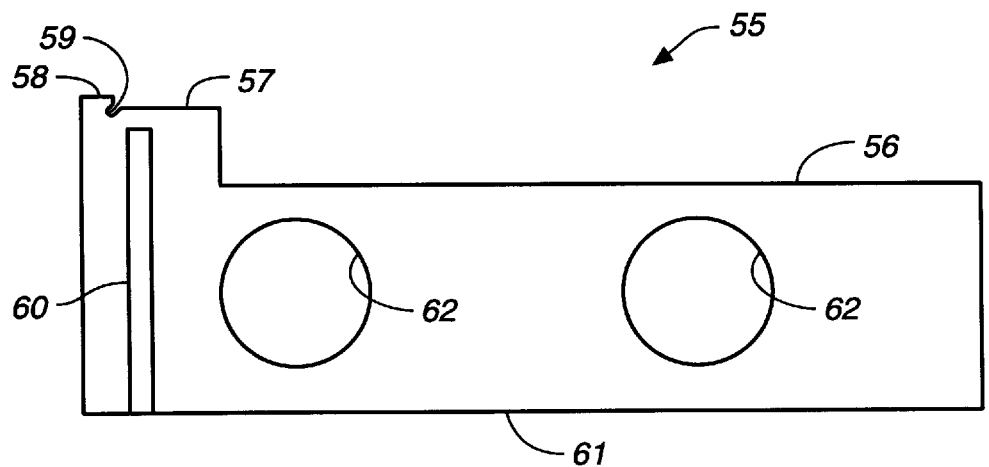
FIG._6

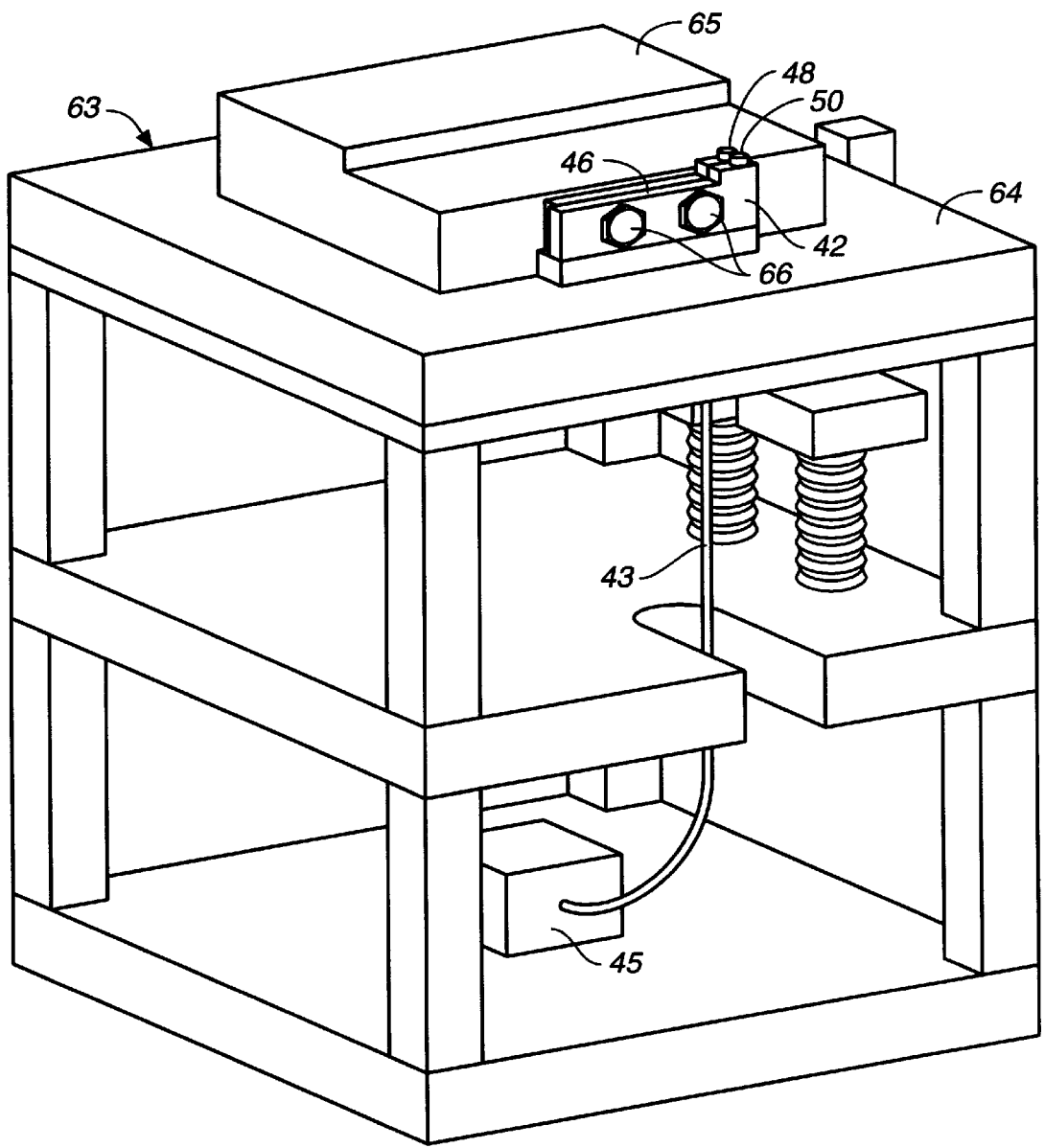
FIG._7

METHOD AND APPARATUS FOR RAPID CURING OF EPOXY ADHESIVE IN SECURING TOGETHER SLIDER/GIMBAL ASSEMBLIES EMPLOYED IN DISK DRIVE SYSTEMS

REFERENCE TO RELATED APPLICATION

This application claims priority of prior filed copending provisional application entitled, METHOD AND APPARATUS FOR RAPID CURING OF EPOXY ADHESIVE IN SECURING TOGETHER HEAD AND SUSPENSION ASSEMBLIES EMPLOYED IN DISK DRIVE SYSTEMS, Ser. No. 60/053,047, filed Jul. 21, 1997, which application is incorporated herein by its reference.

FIELD OF THE INVENTION

This invention relates generally to curing of components to be attached together and, more particularly, to an improved method and apparatus for epoxy curing of attached components in slider/gimbal assemblies employed in disk drive systems.

BACKGROUND OF THE INVENTION

Head suspension assemblies (HSA) in rotatable data storage devices are spring structures that perform the difficult task of accurately holding and positioning a floating head assembly nanometers away from the rapidly spinning and seemingly smooth but microscopically irregular surface of a rotatable data storage device. The HSA can be part of a magnetic hard disk drive, which is the most common data storage medium today, or other type of drives such as an optical or magneto-optic medium in an optical disk drive system. Examples of such HSA's are disclosed in U.S. Pat. Nos. 5,491,597 and 5,645,735, portions of which are included herein, which patents are also incorporated herein in their entirety by their reference.

A HSA comprises different elements, the most common being a suspension beam assembly and a head assembly. A suspension assembly, which includes a spring element, usually includes a load beam which is attached to a gimbal or the gimbal is a unitary part of the load beam, with each composed of a carefully balanced combination of rigid regions and flex spring regions. A typical head assembly usually includes a "head", comprising of a highly sensitive read/write transducer, that is incorporated into an air bearing slider. Thus, the slider comprises a self-acting hydrodynamic air bearing and an electromagnetic transducer for recording and retrieving information on a rotating magnetic disk. The slider is attached to the gimbal and the gimbal is compliant in the slider's pitch and roll axes in order that the slider follows the topology of the disk surface, but is rigid in the yaw and in-plane axes for maintaining precise slider positioning. The load beam is attached to or is made as an integral part of the gimbal, and the load beam is attached to or includes a mounting arm which attaches the entire HSA to an actuator of a disk drive actuator drive assembly. The gimbal also usually includes a portion for the support of electrical traces connected to the transducer and extending along the length of the load beam to its mounted end.

In a magnetic disk drive, the slider supports a read and write transducer. A write transducer transforms electrical pulses to small magnetic fields which it then "writes" on a magnetic disk. A read transducer decodes these magnetic fields back into electrical pulses. The order of the magnetic fields and their subsequent orientation, aligned along the circumference of the disk in a diametrical configuration, defines a bit code that the transducer detects as the head floats on a cushion of air over the magnetic disk. As indicated, the head assembly includes electrical terminals, via traces, to send and receive these electrical pulses.

A HSA generally attaches at its proximal end to a rigid arm manipulated by a linear or rotary motion actuator designed to position the head at any radial location above the disk. The spinning disk coupled with the actuator movement allows the head to gain access to multiple tracks across the disk surface, each track capable of containing large amounts of densely stored data.

Positioned at the distal end of the suspension assembly, a gimbal holds the head assembly level and at a constant distance over the contours of the disk. This gimbal is the most critical of the spring regions in a HSA. The closer the head assembly can fly to the surface of a magnetic disk, the more densely can information be stored (the strength of a magnetic field is proportional to the square of the distance, thus the closer the head flies, the smaller the magnetic "spot" of information). Today's disk drives strive to reach flying clearances close to 100 nanometers=0.1 micrometers (a human hair is about 100 micrometers thick). Greater data densities allow for greater storage and smaller size. But the head assembly must not touch the disk ("crash"), as the impact with the rapidly spinning disk (rotating at about 3600 rpm or faster) could destroy both the head and the surface of the disk, along with the data stored on it.

In order to achieve this delicate and precise positioning, a suspension assembly, and specially the gimbal flexure, must carefully balance the load applied to the head assembly against the upward lift of the air stream on the slider. Since at this microscopic level, the seemingly smooth surface of the disk is full of peaks and valleys, the gimbal spring must be very responsive in order to maintain a level flying height. To avoid delays and errors, it must also resist torsion and momentum forces, and maintain the head parallel to the surface even after rapid repositioning movements. The best suspension assemblies are low in mass, to reduce momentum on the floating head, and very flexible along the Z-axis, perpendicular to the medium surface, to quickly adjust to surface undulations. They also are balanced carefully to reduce static roll and pitch to acceptable levels and to avoid applying an initial twist to the head.

A conventional gimbal flexure, sometimes referred to as a Watrous gimballing flexure design, is formed from a single sheet of material, such as stainless steel, and includes a pair of outer flexible arms about a central aperture, with a cross piece extending across and connecting the arms at a distal end of the flexure. A flexure tongue is joined to the cross piece and extends from the cross piece into the aperture. A free end of the tongue is centrally located between the flexible arms. The slider is mounted to the free end of the flexure tongue. The slider must be mounted to the flexure tongue so that the head assembly is in a predetermined (e.g., planar and parallel) relationship to the disk surface to assure accuracy and overall planarity. As the head writes and reads to and from the disk, it receives and sends electrical pulses of encoded information. Complex head assemblies may require four or more different input and output terminals. The electrical signals are relayed to appropriate amplifying and processing circuitry. Signal transmission requires conductors between the dynamic "flying" slider and the static circuitry of the data channels. However, while conductors can be routed fairly easily along the rigid actuator arm, providing the final interconnections through the suspension assembly, and specially those over the gimbal to the head, it is often extremely troublesome with current interconnect schemes, particularly as head structures become smaller in size and, correspondingly, becomes more fragile and acceptable to mechanical damage or heat damage. Thus, the interconnection of head components becomes more critical due to higher potential to damage from mechanical connection stresses or thermal stresses, such as is occurred during head component (load beam/gimbal/slider) attachment.

Specially designed HSA interconnect assemblies are required in order to relay electrical signals accurately while not disturbing the precise balance of the HSA components. The term interconnect assembly refers to the entire interconnect system in a HSA, including conductors, insulators, and other features. In order to assure data precision, interconnect assemblies must transmit the electrical signals free from interference or signal loss due to high inductance, high capacitance, or high resistance. Optimal interconnect assemblies must be attached securely in order to reduce movement and vibration which cause varying electrical characteristics and affect mechanical performance. They must have low resistance and be well insulated from electrical ground.

Also, as technology advances, an interconnect system also must be capable of handling a plurality of signals. A basic interconnect assembly for a transducer having a single read/write inductive element calls for two conductors. More complex transducer designs may incorporate a separate magneto-resistive read element and an inductive write element, thus requiring a minimum of three conductors if the elements are tied together or a minimum of four conductors if the elements are completely separate. More advanced systems require even more conductors.

Thus, HSA-interconnect assemblies must be planned around competing and limiting design considerations. The interaction of all the elements of an HSA forms a carefully balanced system. An ideal interconnect assembly must satisfy strict mechanical and manufacturing requirements.

The general technology trend in disk drive data storage devices is continual shrinking of the physical size of the HSA while providing increased data storage capacity. The down-sizing of the HSA has required smaller components, especially the principal components such as disks, sliders and load beams or flexures. Additionally, disk drive designers seek to add capacity to their designs by incorporating as many disks as possible within defined package dimensions. As the number of disks in the unit increases, the spacing between the disks decreases, thus further driving the need for smaller sliders and flexures. Smaller sliders and suspension beam assembly means more critical assembly requirements such as, for example, less application of applied heat in the case of assembled head components secured by epoxy adhesive that is cured at a high temperature. The slider bonding surface, in general, covers a large area over the center of the slider. The slider is typically attached to the load beam or flexure with an adhesive, such as epoxy, and, in order to reduce the cure time of the adhesive, the assembly is usually heated in an oven (e.g. oven curing) or by exposing epoxy in the slider to UV radiation. Depending upon the application, an electrically conductive or nonconductive adhesive or the like may be used. The time of applied heat to achieve curing is critical and should be sufficiently small so as not to damage the slider transducers or associated conductors but sufficiently large to permit proper completion of the curing step.

Another industry trend is to provide the user of disk drives with high data storage capacity at low cost. This requires developing improved data recording technology and finding lower cost ways of manufacturing the components of the disk drive including increase efficiency in the manufacturing steps.

A principal object of this invention is to provide an improved method and apparatus for the attachment of the slider and the distal end of the suspension beam/gimbal assembly that is time-efficiently accomplished without damage to the assembled components.

SUMMARY OF THE INVENTION

According to this invention, a laser source power is delivered via an optical fiber to the slider air-bearing surface (ABS) of the slider head assembly so that with this approach, the time for curing can be minimized and accurately controlled without causing damage to the assembly, and the overall curing step in the manufacturing process is reduced in time of application. Apparatus in the form of a fixture or anvil, such as an anvil element, provides a convenient gauge and support for alignment of the laser output beam with the slider ABS to which the heat for curing is to be applied as well as provide for its heat sinking thereby eliminating damage to the slider, such as cracking, and other components of the assembly such as the transducer itself.

A method is disclosed for curing epoxy adhesive between head and suspension assemblies using a concentrated heat source in the form of a laser beam rather than conventional, broadly applied heat sources employed in the past, such as oven heating, UV exposure or a hot air stream. In the preferred form of the invention, the laser source power is delivered via an optical fiber to the slider air-bearing undersurface of the head assembly and not from the top surface. As a result of this approach, the time for curing can be minimized without damage to heat sensitive components in the suspension beam/gimbal assembly. Apparatus in the form of an anvil provides a convenient support for applying the laser beam output in aligned proximity to the slider air-bearing surface of the head and suspension assemblies to be joined by the epoxy adhesive.

Other objects and attainments together with a fuller understanding of the invention will become apparent and appreciated by referring to the following description taken in conjunction with the accompanying drawings.

BRIEF DESCRIPTION OF THE DRAWINGS

FIG. 1 is perspective, exploded view of a typical HSA.

FIG. 2 is an enlarged detail view of the suspension interconnect assembly shown in FIG. 1 including the bonding pads to which the slider of the head assembly is secured.

FIG. 3 is a perspective view of a first embodiment of apparatus employed in the practice of the method of this invention.

FIG. 4 is side elevation of the apparatus shown in FIG. 3.

FIG. 5 is a perspective view of a second embodiment of apparatus employed in the practice of the method of this invention.

FIG. 6 is side elevation of the apparatus shown in FIG. 5.

FIG. 7 is a perspective view of the assembly station employing the apparatus of either of the foregoing embodiments.

DETAILED DESCRIPTION OF THE PREFERRED EMBODIMENTS OF THE INVENTION

A head suspension assembly (HSA) 10 is the combination of elements that positions a head assembly 12 over selected tracks of a rotating data storage device. The illustration here is taken from U.S. Pat. No. 5,491,597, which is incorporated herein by it reference and represents a typical head/gimbal suspension assembly as known in the art. HSA 10 includes a suspension assembly comprising components 20, 30 and a head assembly 12. Suspension assembly 10 includes a load beam 20 and a gimbal flexure and electrical interconnect assembly 30. The term "interconnect assembly" refers to a whole interconnect system that transmits electrical signals across HSA 10. A gimbal flexure is the structure that suspends the head level over the surface of the spinning disk (not shown), even while the head suspension assembly pivots, inclines or bends. A head assembly 12 includes an air-bearing slider having an air-bearing surface 12A, a transducer, and electrical terminals 14. We also refer to this head assembly as slider 12. Slider 12 may be a ceramic material that is a combination of TiC and alumina.

Load beam 20 includes a rigid portion 22 and has a distal end portion 25 shaped to support a gimbal flexure, and a proximal end portion 26, that may be shaped for attachment to an actuator arm (not shown). Load beam 20 has a spring region 28 adjacent to the proximal end portion 26, and a rigid region 22, located in between spring region 28 and distal end portion 25. The load beam 20 is preferably planar and made of stainless steel by methods known in the art.

Gimbal flexure element 30 is constructed as a separate element to be later attached to complete the suspension assembly, specifically to the undersurface of rigid portion 22 of load beam 20 at end 25 forming a gimbal assembly (customarily the side that will face the recording disk). As previously indicated, gimbal flexure element 30 can be an integral part of load beam 20. Gimbal flexure element 30 includes a set of traces 32, a set usually having two generally parallel traces 33 completing a circuit. Traces 33 are generally coplanar and placed side by side. The same circuit traces function for both the read and write modes relative to the head transducer.

Traces 33 may be comprised of an electrically insulated linear thin substrate-free conductor. It can be flexible, but is also resilient and can be pre-shaped to match different configurations. Nevertheless, it can be shaped in other low-profile cross-sectional shapes. Traces 33 are constructed of a single layer conductive spring material. Spring materials are those that do not plastically deform or yield under the most extreme loads a gimbal endures during its assembly and drive use. Preferred materials have a tensile strength and a yield strength similar to those of the suspension assembly where the tensile strength is typically a minimum of 1.1 gigapascals and the yield strength is typically a minimum of 1.0 gigapascals. Traces made of preferred materials are usually self-supporting. Although the traces may be photochemically etch in series out of a long stripe of material, they can be also stamped, machined via electrical discharge means, or shaped by other processes known in the art.

Gimbal portion 36 of gimbal flexure element 30 is located at a distal end of the set of traces 32 and functions as a gimbal flexure means for mechanically coupling with distal end portion 25 of load beam 20, providing gimballing support for floating slider head 12, and electrically coupling of traces 32 to the slider electrical terminals 14. Virtually every gimbal design known in the art can be employed relative to this assembly as well as the practice of the method of component attachment to be yet described. BeCu may be used as the material for the traces 33 because it so resembles the yield and tensile properties of stainless steel and avoids any thermal expansion considerations between these two materials.

Connector portion 37 is located at the proximal end of the set of traces 32. In this portion, the traces 32 may widen and/or deflected to extend past load beam 20. This is done in order to offer a good connection surface to couple the set of traces 32 to other circuitry.

As shown in FIG. 1, distal end portion 25 of load beam 20 is shaped with a projecting rectangular tongue 70. Tongue 70 includes an alignment and location hole 71 and an gimbal pivot 72. Pivot 72 creates a convex semi-spherical protuberance rising out of surface 22 of load beam 20.

As best seen in FIG. 2, gimbal portion 36 with the set of traces 32 includes a pair of symmetrical torsion arms 38 extending from the set of traces 32 and load beam portion 34. At least one of the torsion arms 38 id electrically insulated from load beam 20. Each torsion arm 38 is shaped as a part of a usually symmetrical gimballing spring pattern. The distal end of the arms spreads into an enlarged horizontal slider bond pad 39 that will provide an attachment contact surface for slider 12. At the distal end of load beam tongue 70, arms 38 proscribe a 90° curve and spread into a pair of symmetrical flexure bond pads 39 shaped and arranged to provide a contact surface for the slider 12. Bond pads 39 can be any shape that will provide a suitable coupling and gimballing surface. The bond pads are designed to offer mechanical connection and support to slider 12. In FIG. 2, these pads are shaped as back-to-back "P"s, with a semicircular indentation approximately at the middle of each back. The indentation defines a round clearance hole 73 that fits around and receives gimbal pivot 72. This allows slider 12 to swivel on gimbal pivot 72. Connection tangs 40 extend in a soft radial break perpendicularly away from pads 39 and provide final positioning of slider 12 prior to its attachment to load beam 20. Tangs 40 are also located to facilitate connections to the slider electrical terminals or flex circuit 14. The slider transducers are mounted on the vertical edge 12B of slider 12.

As previously indicated, the HSA's have undergone recent design changes that render the size of slider 12 so that the storage capacity can be enhanced. However, traditional ways assembling slider 12 to the load/gimbal suspension assembly 20, 30 are not now so useful since the treatment with heat to cure the epoxy or adhesive that attaches these components together may be either too extensive of an application, as in the case of oven curing, or lacks adequate exposure such as in the case of UV exposure since the smaller-sized slider is substantially hidden from view by the bulk of the suspension assembly. Moreover, excessive heat may damage the smaller slider assembly so that it is important that this curing time of the adhesive be as short as possible and that the temperature of the transducer incorporated in the slider be kept below a preferred level, such as below about 110° C. to 120° C. Also, it is desirable to optimize the heating curing step, time-wise, so that costs in performing this particular step in the assembly process can be more cost effective.

The present invention achieves this foregoing goal by employing laser beam heating that is focused to the region of the adhesive so that the epoxy cure time is maintained to the minimum possible time thereby shortening the time of the work step for performing this operation, i.e., the time required to load the workpiece at the station, apply the laser beam, and move the workpiece to the next station. The curing step can be time-minimized by apply the laser beam to heat the combined suspension and head assemblies in order to more rapidly cure their epoxy adhesive coupling. One approach to accomplish this is to assemble the load/gimbal suspension assembly 20, 30 and slider 12 for adhesive coupling employing the tacky existence of the epoxy to maintain the aligned relationship of these components prior to final curing of the epoxy. The laser beam heat may then be focused upon the top surface of the distal end 25 of the assembled components to bring about the necessary epoxy curing. However, this applied approach to bring about the desired curing of the epoxy is not preferred because, particularly in recent times where the size of slider 12 has become comparatively much smaller in size in order to enhance the storage capacity of the recording system, as referenced earlier herein. Also, the interconnections to the slider transducer have being more miniaturized so that these components are well hidden within the confines of the suspension load beam 20 so that top surface heating via laser beam heating, while a simple but more direct approach, is not the most preferred since the gimbal portion includes a layer of circuit lead traces and insulating polyimide and applying localized heat via a laser beam from the top or load beam side at 25 of the assembly requires a longer period of time to complete the curing process, enhancing the possibility of more direct potential damage to the slider. To be noted, however, is that the undersurface or the air-bearing surface (ABS) 12A of slider 12 is unencumbered to receive such concentrated, applied heat for performing the curing step. Thus, laser beam applied heating to air bearing surface 12A of the ceramic slider 12 is best for reducing the time required for accomplishing the curing step with localized heating while eliminating potential damage to the circuit traces and insulation as in the case where the heat is applied through the metal distal portion 25 of load member 20. We have discovered that, rather than apply curing, in general, such as by oven heating, UV exposure or hot air stream to the entire assembly 10, the curing of the epoxy can be accomplished in a minimal period of time, such as over a period of several seconds, with a low localized temperature below about 120° C. The applied curing temperature is sufficiently short so as not to cause any damage to the transducer at the slider as well as damage traces 33 or insulting material such as polyimide. The employment of a short burst of laser energy to provide curing heat makes it possible to reduce epoxy curing time to the minimum possible time so as not to damage any of the assembly components as well as reduce the manufacturing time require for the curing process of loading the workpiece in proper position for curing, energizing the laser to bring about curing, and thereafter moving the workpiece to the next process station in the manufacture of the disk drive assembly.

To better understand the advantages of the curing method comprising this invention, the present process should be reviewed and compared with prior curing methods. A very thin layer of adhesive, such as epoxy, is applied between the bond pads 39 and the top surface of slider 12. The assembly is held in a fixture to properly align the slider with the gimbal pads 39 and the load beam 20. In the fixture, the bottom of the slider 12 is in contact with a metal or ceramic surface the provides some cooling of the slider during the curing process since it thermally conducts away heat applied during the curing process. An ideal curing process dictates the application of heat only to the bond pads and the heat then flows into the epoxy bond and cures the epoxy. Theoretically, a full cure of the epoxy is achieved. But, a partial cure of the epoxy at this stage usually result and has been considered acceptable as a first curing cycle in a two stage process. A full cure can be achieved in a subsequent, second curing cycle, such as through the use of a curing oven. During this second curing cycle, no fixture is necessary to hold the load/gimbal/slider suspension assembly as in the case of the first curing cycle.

In earlier designs of these types of load/gimbal suspension or head assemblies, the sliders and the bond pads were large enough so that part of the bonding pads were directly accessible to a small, focused laser beam from the top of the slider head assembly, i.e., the laser beam directly contacts the surfaces of pads 39 since the size and width of support or distal end 25 is small, providing a convenient heat source to cure the epoxy. Even when a larger laser beam was employed, resulting in more of the surrounding components of the assembly being heated, there was still enough direct heating of the bonding pads to achieve a good first curing cycle in spite of the presence of distal end 25 of load beam 20. The combination of heating through the bonding pads and cooling through the bottom of the pad into the support fixture worked well. The epoxy can be cured without damage to the electrical components in the slider and cooling through the bottom of the slider helps to protect these electrical components by maintaining the temperature during the curing cycles well below their temperature damage level.

However, as the sliders and the head assembly have became smaller and smaller in size, the distal end 25 of the load beam 20 more and more shadows or shields the bonding pads 39 from the laser beam. In the present state-of-the-art slider head designs, the bonding pads 39 are completely shadowed or shielded by the load beam end 25, and a laser beam cannot now be directly applied to the surface of bonding pads 39 for performing the curing process. Heating of the epoxy now depends on heating the surrounding components and heat conduction from these components into the epoxy. This is not a well controlled process, and generally has not been successful for head manufacturers. Other curing processes have been developed and are now being used, one such process comprising the step of directing a small stream of hot air at the distal end of the assembly. This approach works, but still suffers from inadequate control of the heating of the epoxy, providing higher probability of damage of the electrical components in the slider.

According to the method of this invention, curing of the adhesive between the gimbal pads 39 and slider 12 through heating is accomplished through the bottom surface 12A of slider 12. Surface 12A is totally unencumbered and, by proper design of the laser apparatus and support fixture for the load/gimbal/slider suspension assembly 20, 30, the portion of the bottom surface 12A that is heated by the laser beam pulse and cooled by the fixture can be very well controlled. Also, the ceramic or other material comprising slider 12 is generally quite dark or black, and absorption of the laser light by the slider is good and well controlled. Thermal conductivity of the slider material is also good and the epoxy can be effectively heated through the material comprising the slider. The bonding pads and surrounding components also provide some cooling to control the process. The heating, cooling and material properties of slider 12 are well enough defined so that the curing process of this invention can be modeled quite accurately. Controlled conductive thermal cooling is obtained through the laser support fixture or anvil. This modeling shows that the epoxy can be heated through its curing cycle while not overheating the slider electrical components. Experiments have confirmed this modeling. An epoxy curing process by heating slider 12 through its bottom surface to cure the epoxy adhesive holding the slider on the gimbal bonding pads provides a viable process that eliminates the foregoing problems in achieving a comparatively better controlled curing step with minimal processing time.

Reference is now made to FIGS. 3 and 4 which illustrate a first embodiment of apparatus of this invention comprising fixture or anvil 42 for receiving the workpiece in the form of the load/gimbal suspension assembly 20, 30 and slider 12 for adhesive coupling through heat curing. Heat for curing is supplied via a laser beam from fiber 43 coupled to a laser source 45, e.g., a fiber laser. An example of such a laser source 45 is Model SDL-FD25, manufactured and sold by SDL, Inc. of San Jose, Calif., comprising a 15 W continuous power employing a fiber laser pumped with an optically coupled P6 laser diode. Laser source 45 is capable of providing one to several watts of laser light from a semiconductor laser pumped rare earth fiber laser. Fixture 42 comprises an anvil shaped piece, which may be comprised of zirconia having good thermal conducting properties, and having a lower surface 47 and an upper surface 46 that includes a support, alignment and gauging surface at 48, formed by abutment 50, to receive slider 12 and the forward end of suspension assembly 20, 30 in proper aligned relation on surface 48, as indicated by positioning arrow 53. As indicated, surface 48 includes abutment 50 to provide a standing edge to function as a gauging surface to receive slider 12 substantially central of an axis of a formed opening 51 in anvil 42. To be noted is that the center of slider 12 is positioned in proximity to the output end 43A of fiber 43 when the fiber end is inserted into opening 51 to top surface 48, as indicated by arrow 52. Fiber 43 may be secured in opening 51 by any convenient means such as by force-fit or an adhesive.

Surface 48 where it meets abutment 50 to form an inside corner may include a groove 49 so that the corner edge of slider 12 fits accurately against abutment 50.

Fiber 43 is inserted in opening 51 until it engages the upper end 51A of opening 51. Opening 51 is spaced a short distance from top surface 48 so the heat from the laser beam may be distributed through thermally conductive anvil portion 42A to be more uniformly applied, via thermal conduction, across the lower surface 12A of a prepositioned slider 12. Alternatively, opening 51 may extend to and through surface 48 so that the laser beam output is applied directly to the undersurface 12A of slider 12.

Anvil 42 is provided with apertures 54 for its mounting at workstation 63 shown in FIG. 7.

FIGS. 5 and 6 illustrates a second embodiment of this invention comprising fixture or anvil 55 having a lower surface 61 and upper surface 56 which includes a support, alignment and gauging surface 57 for receiving the workpiece in the form of the load/gimbal assembly 20, 30 and slider 12 for adhesive coupling through heat curing with applied heat supplied via a laser beam from fiber 43 coupled to a laser source 45 as illustrated previously in connection with the embodiment in FIG. 4. Alignment surface 57 receives slider 12 and suspension assembly 20, 30 in proper aligned relation on its surface relative to slot or groove 60 formed in the side surface of anvil 55. The output end 43A of laser fiber is inserted into slot or groove 60 and is held in position by any convenient means such as force-fit or an adhesive. Alignment groove 59 and abutment 58 provide for exacting alignment of slider relative to the axial center of the positioned laser beam output within slot or groove 60, as indicated in the previous embodiment.

As in the case of the previous embodiment, anvil 55 is provided with apertures 62 for its mounting at workstation 63 shown in FIG. 7.

FIG. 7 shows a workstation 63 comprising bench surface 64 for supporting station block 65. Anvil 42 (or anvil 55) is mounted to an edge of block 65 by means of bolts 66. Laser source 45 may be mounted on another shelf or surface of station 63 with its output fiber 43 coupled into anvil 42 in the manner as previously explained in connection with FIG. 4.

In operation, the epoxy or other adhesive is applied between the lower surface of distal end portion 25 of suspension assembly 20/30 and the upper surface of slider 12. These parts are properly aligned as the epoxy is in a tacky stage so that these parts may be easily repositioned to final alignment. Upon final alignment, the assembly is positioned with the side face of slider 12 against the gauging surface of anvil abutment 50. Next, the laser source 45 is operated, such as with a foot switch (not shown), to apply a preset laser pulse for a predetermined amount of time to bring about permanent attachment of the slider 12 and suspension assembly 20, 30. The assembled workpiece is then removed from anvil 42 and is transferred to the next operating station.

Two important considerations in the method of applying this assembly step is the curing time of the epoxy adhesive be maintained as short as possible and that the temperature of the transducer incorporated in the slider be kept below a temperature where it may be damage by the concentrated heating power of the laser beam. Thus, the essence of this curing step is to supply to the underside of the slider a significant amount of heat for a sufficient retention time to bring about complete curing of the epoxy. In this manner, the curing time can be maintained at the minimum possible time and the overall station time, i.e., the time required to load the assembly-slider workpiece, apply the laser beam energy and remove the workpiece to the next station, may be optimized. The amount power dosage may be approximately several seconds, e.g., about 2 seconds to about 30 seconds employing about 0.5 W to 2 W fiber laser output. The energy delivered from a 1 watt fiber laser can deliver a temperature rise to slider surface 12A up to about 190° C. in about 2 seconds or more. Thus, the power can be regulated to provide a cw pulse of sufficient duration or applied as a series of pulses to achieve, in a minimum time, the desired heat level below 120° C., such as in the range of 110° C. to 120° C., for example, which is maintained for a period of time comprising several seconds to achieve the proper curing time period (e.g., about 5 seconds for a 1.5 W beam or about 15 seconds for a 0.5 W beam) in a minimum amount of time, compared to prior art heating methods which require broad area heating application. Since the heat power is concentrated in a beam so as to minimize area application, the curing time can be optimized to a minimal period of time and the time required to transfer the cured workpiece to the next succeeding workstation can be optimized.

Although the invention has been described in conjunction with one or more preferred embodiments, it will be apparent to those skilled in the art that other alternatives, variations and modifications will be apparent in light of the foregoing description as being within the spirit and scope of the invention. As an example, the illustration in this invention has been directed to magnetic read/write HSA's in magnetic type recording systems. However, the invention herein is equally applicable to magneto-optic recording heads where there is a need to assemble components of the head in a quick and efficient assembly step using heat cured epoxy or other heat cured adhesive material. Thus, the invention described herein is intended to embrace all such alternatives, variations and modifications as that are within the spirit and scope of the following claims.

What is claimed is:

1. A method of curing an adhesive in securing a head assembly, having a slider, to a suspension assembly comprising the steps of:

applying an adhesive to either or both adjoining surfaces of the head assembly and the suspension assembly;

joining and aligning the head and suspension assemblies; and applying a laser beam pulse to the adjoined assemblies until curing of the adhesive is achieved, and applying the laser beam to an air-bearing surface (ABS) of the slider.

2. The method of curing of claim 1 including the further step of applying the aligned head and suspension assemblies to a gauging surface for alignment of the ABS of the slider with the laser beam output prior to applying of the laser beam pulse.

3. A method of curing an epoxy adhesive in a head suspension assembly for securing together a gimbal member with a slider comprising the steps of:

directing a laser beam output to the air bearing surface (ABS) of the slider; and applying a laser beam pulse of sufficient energy and duration to complete curing of the epoxy adhesive.

4. The method of claim 3 wherein the laser beam energy is in the range of about 0.5 W to about 2 W and the duration of the pulse is in a range of about 2 seconds to about 20 seconds.

* * * * *